United States Patent [19]
Willen et al.

[11] 3,830,077
[45] Aug. 20, 1974

[54] HEAT EXCHANGER FOR CONNECTION IN EVAPORATOR-TO-COMPRESSOR LINE OF AIR CONDITIONER

[75] Inventors: Harold A. Willen, 1399 Holly Ln. N.W., Atlanta, Ga. 30329; James L. Little, Atlanta, Ga.

[73] Assignee: said Willen by said Little

[22] Filed: July 20, 1972

[21] Appl. No.: 273,630

[52] U.S. Cl. ................................. 62/238, 165/43
[51] Int. Cl. ............................................ F25b 7/02
[58] Field of Search ....................... 165/139–144, 165/163, 43, 4, 73–75, 168, 162; 123/41.19; 62/243, 238, 113, 512, 513

[56] References Cited
UNITED STATES PATENTS
| | | | |
|---|---|---|---|
| 772,339 | 10/1904 | Condict | 165/163 |
| 1,936,284 | 11/1933 | Bergman | 165/163 |
| 2,327,451 | 8/1943 | Perrine | 62/243 X |
| 2,776,648 | 1/1957 | Taylor, Jr. | 123/41.19 |
| 3,070,975 | 1/1963 | Cornelius | 123/41.19 X |
| 3,209,551 | 10/1965 | Jentet | 62/243 X |

*Primary Examiner*—Charles J. Myhre
*Assistant Examiner*—Theophil W. Streule, Jr.
*Attorney, Agent, or Firm*—Clarence A. O'Brien; Harvey B. Jacobson

[57] ABSTRACT

A heat exchanger connected into the refrigerant return line from the evaporator to the compressor in an air conditioning system of a vehicle to enable the cooling of various working fluids in a vehicle such as transmission fluid, gasoline, power steering fluid or the like to render operation of the vehicle more efficient and dependable.

1 Claim, 3 Drawing Figures

PATENTED AUG 20 1974 3,830,077
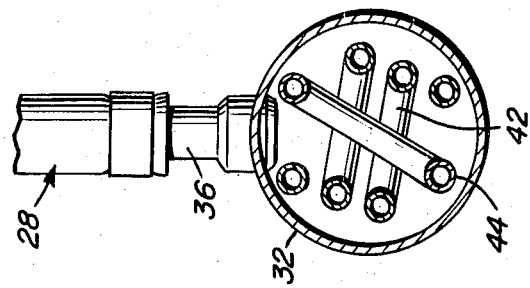
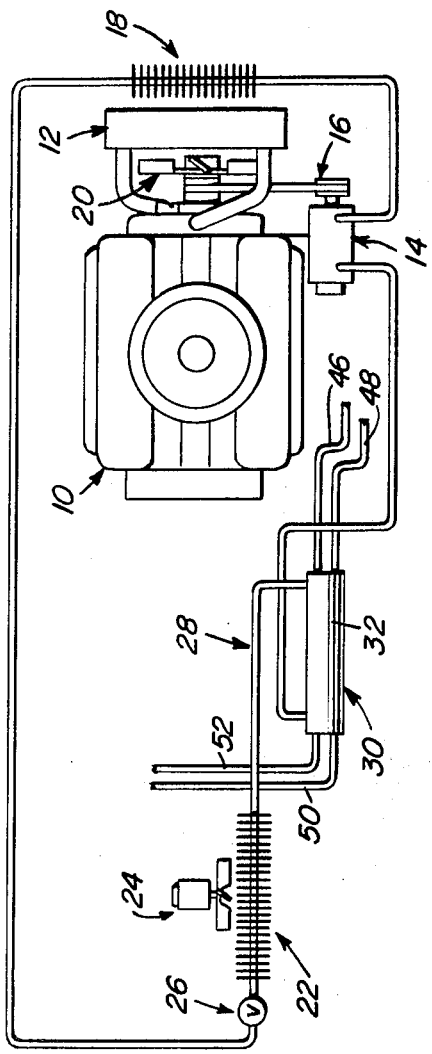
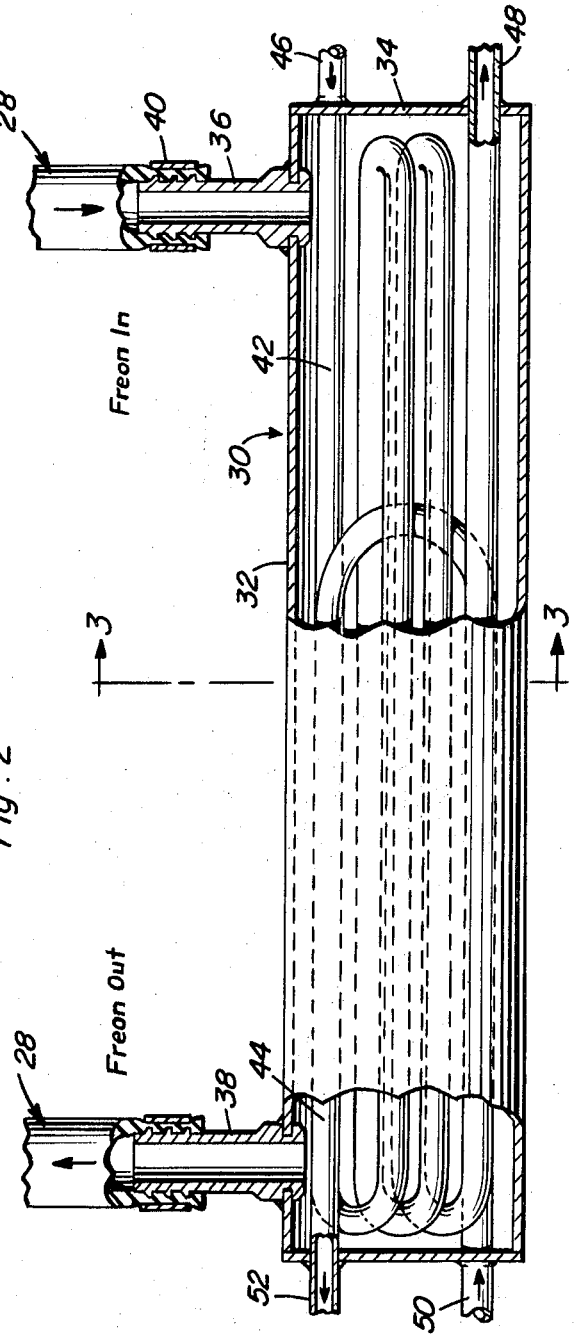

HEAT EXCHANGER FOR CONNECTION IN EVAPORATOR-TO-COMPRESSOR LINE OF AIR CONDITIONER

BACKGROUND OF THE INVENTION

1. Field of the Invention

An auxiliary heat exchanger connected into the refrigerant return line from the evaporator to the compressor in an air conditioning system of a vehicle to enable a working fluid or fluids in the vehicle to be cooled to maintain the operating levels of such fluid or fluids at a desired temperature for more efficient operation.

2. Description of the Prior Art

Air conditioning systems incorporated into various vehicles have been well known for many years and effectively enhance the environmental atmosphere within such vehicles for the operator thereof or passengers being carried. Most present day air conditioning systems employed in vehicles utilize a refrigeration system that includes a compressor driven from the power source or engine which normally drives the vehicle, a condenser that is air cooled by ambient air passing thereover, an evaporator disposed in or communicated with the enclosed area to be cooled with these components being oriented in a series relationship and operating in a well known manner. Also, it is known that the return line for the refrigerant from the evaporator to the compressor can be utilized in an auxiliary heat exchange device.

U.S. Pat. No. 3,070,975, issued Jan. 1, 1963, discloses such a system in which the return line from the evaporator to the compressor is provided with a heat exchanger for cooling the water or other coolant in the vehicle cooling system. This patent discloses various arrangements of associating the return refrigerant line with the engine coolant but in all instances, the refrigerant passes through the interior of a heat exchange coil which introduces a substantial pressure drop that causes a substantial increase of the load on the compressor. U.S. Pat. No. 2,884,768 discloses an auxiliary heat exchanger for cooling a hold-over medium in a tank to enable refrigeration capacity to be accumulated. U.S. Pat. No. 1,913,273, issued June 6, 1933, discloses the use of multiple evaporators in the passenger compartment of a vehicle with the multiple evaporators being oriented in series relation.

While auxiliary heat exchangers or secondary evaporators in air conditioning systems for vehicles are known, such devices have been used primarily for additional cooling of the passenger compartment or cooling of the engine coolant and tend to increase the load on the compressor due to the additional flow restrictions caused by the refrigerant passing interiorly of the heat exchange coil.

SUMMARY OF THE INVENTION

An object of the present invention is to provide a heat exchanger for connection into the refrigerant return line between the evaporator and the compressor of an air conditioning system in a vehicle in which the heat exchanger includes a shell having the refrigerant return line communicated therewith so that substantially no restriction to flow of refrigerant occurs thereby eliminating any increase in load on the compressor of the air conditioning system.

Another object of the invention is to provide a heat exchanger in accordance with the preceding object in which the shell of the heat exchanger is connected in series into the refrigerant return line so that returning refrigerant will flow through the shell of the heat exchanger and over the external surfaces of a heat exchange coil disposed therein for cooling a hot fluid passing through the coil thereby cooling the hot fluid without any restriction in the flow of the refrigerant to the compressor thereby eliminating any increase in load on the compressor and also effectively utilizing the residual cooling capacity of the refrigerant returning from the evaporator to the compressor.

A further object of the invention is to provide a heat exchanger in which a single heat exchange coil or multiple heat exchange coils are employed to enable heat exchange between the refrigerant and one or more diverse hot fluids passing through the heat exchange coil or coils.

Still another object of the invention is to provide a heat exchanger in accordance with the preceding objects which is quite simple in construction, easy to install, effective for cooling a working fluid or fluids in a vehicle without adversely affecting operation of the air conditioning system while retaining the operating fluids in the vehicle at a desired temperature level.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic view of the air conditioning system in a vehicle with the heat exchanger of the present invention incorporated into the return line from the evaporator to the compressor.

FIG. 2 is an enlarged plan view of the heat exchanger with portions thereof broken away illustrating the structure of the heat exchanger, the refrigerant lines and the association of two heat exchange coils disposed within the shell of the heat exchanger.

FIG. 3 is a transverse, sectional view taken substantially upon a plane passing along section line 3—3 of FIG. 2 illustrating further structural details of the heat exchanger and the association of the multiple heat exchange coils in the heat exchanger.

DESCRIPTION OF THE PREFERRED EMBODIMENT

Referring now to the drawings, FIG. 1 illustrates schematically a vehicle engine 10 having the usual radiator 12 associated therewith and an air conditioning system including a compressor 14 driven by suitable power take-off 16 from the engine 10. The compressor 14 is communicated with a condenser 18 oriented forwardly of the radiator 12 so that the hot gaseous refrigerant passing through the condenser 18 will be cooled by the ambient air which also passes through the radiator 12 and which is caused to pass through both the condenser 18 and radiator 12 by the usual fan 20. The condenser 18 is communicated with an evaporator generally designated by the numeral 22 provided with a suitable fan 24 for cooling a passenger compartment, operator's compartment or other enclosed space in a vehicle. The refrigerant expands in the evaporator 22 due to a flow restriction device 26 in the form of an expansion valve, capillary device or other conventional device employed in air conditioning systems. From the evaporator 22, the refrigerant returns to the compressor through a return line 28 thus completing the circulation of the refrigerant from the compressor 14 through the other components of the air conditioning system back to the compressor 14 with all components of the air conditioning system being conventional and acceptable for use in vehicle air conditioning systems.

The heat exchanger of the present invention is generally designated by the numeral 30 and is inserted into the refrigerant return line 28 thus requiring only that the return line 28 be disconnected and the heat exchanger 30 inserted therein with the particular location of the heat exchanger 30 being varied depending upon each installation requirement, that is, the heat exchanger 30 may be adjacent the compressor, oriented in any position in the engine compartment of a vehicle or oriented in any other desired location in the vehicle with it only being necessary that the return line 28 be disconnected or interrupted and connected to the heat exchanger 30.

As illustrated in the drawings, the heat exchanger 30 includes a shell 32 which may be of cylindrical configuration or any other desired shape with the shell 32 including end walls 34 all of which are connected in a manner to provide a closed shell having an inlet adapter 36 adjacent one end thereof and an outlet adapter 38 adjacent the other end thereof so that return refrigerant from the evaporator will pass through the return line 28 into the shell 32 through the inlet adapter 36 and will exit from the shell 32 through the outlet adapter 38 back into the return line 28 to the compressor 14 as illustrated in FIG. 1. The adapters 36 and 38 are, of course, sealed to the shell 32 by any suitable technique such as welding or the like and the return line or conduit 28 which is usually in the form of a flexible hose is sealingly clamped to the adapters 36 and 38 respectively by a suitable clamp device 40. Thus, the heat exchanger is connected into the return line 28 so that refrigerant will flow into the shell 32 adjacent one end thereof and out of the shell 38 adjacent the other end thereof with the interior of the shell being sufficiently large to enable the refrigerant to pass therethrough with very little restriction and of sufficient volume to enable expansion of the refrigerant for reducing the interior temperature within the shell 32. Also, the outlet adapter 38 is somewhat larger in diameter than the inlet adapter 36 thereby assuring that there will be no restriction to return flow of the refrigerant from the heat exchanger 30 back to the compressor 14.

Disposed within the shell 32 of the heat exchanger 30 is a pair of heat exchanger coils 42 and 44 with the coil 42 including a plurality of elongated convolutions generally oval-shaped in configuration and including an inlet portion 46 and an outlet portion 48 extending through the end wall 34 and sealed thereto by welding or the like. The coil 42 is the primary heat exchange coil and includes the arrangement in which the inlet convolution thereof with which the inlet 46 is communicated is adjacent the inlet adapter 36 so that the incoming refrigerant will contact the exterior of the coil 42 adjacent the inlet 46 thereof where the incoming heat exchange fluid will be the hottest. The other coil 44 includes a single U-shaped convolution having an inlet 50 and an outlet 52 with the outlet 52 being disposed adjacent the outlet adapter 38 so that the refrigerant passing through the shell will come into heat exchange contact with the external surfaces of the coils 42 and 44 for cooling the hot fluid passing therethrough with the coil 44 being in the form of a secondary coil.

It is pointed out that only a single coil 42 may be employed when only a single hot fluid is desired to be cooled or two coils 42 and 44 having different cooling capacities due to the difference in the convolutions and external surfaces exposed to the cooling refrigerant may be provided or any desired number of cooling coils may be provided in the heat exchanger thereby enabling various working fluids in a vehicle to be cooled.

While the dimensions of the device may vary, it has been found that the construction of the shell 32 may be seamless aluminum tubing 12 inches in length and 2½ inches in outside diameter and the cooling coils are constructed of seamless aluminum tubing of 0.325 inch outside diameter with the primary coil 42 being 6 feet in length and the secondary coil 44 being 16 inches in length. However, these dimensions may vary and the device still operate effectively.

The heat exchanger 30 may be utilized for improved operation on any vehicle that has an air conditioning system installed therein and is utilized to cool a hot fluid normally employed in the vehicle for more effective and dependable operation of the vehicle. Such hot fluids may include the transmission fluid, gasoline, power steering fluid or any other working fluid in the vehicle which requires heat removal. The shell 32 is so constructed and the refrigerant passes exteriorly of the coil for heat exchange contact with the external surface of the coil or coils in order to minimize pressure drop through the heat exchanger 30 thereby reducing or eliminating any increase in the load on the compressor. The use of this heat exchanger in cooling the gasoline prior to it entering the fuel pump or carburetor will eliminate the formation of vapor bubbles in the gasoline line during periods of hot weather thereby eliminating the cause of many stalled engines and difficult starting during hot weather which is caused by a condition commonly referred to as vapor lock.

The heat exchanger of this invention is not limited to use in passenger automobiles but could be employed in various other vehicles such as trucks, buses, various farm equipment, industrial equipment and other machinery and vehicles employing air conditioning systems and having other working fluids desired to be maintained at a lowered temperature. The device is especially useful in vehicles that are in constant use or heavy use which use tends to overheat transmission fluids, power steering fluids and the like. For example, vehicles employed as police vehicles, taxi vehicles, mobile home towing vehicles, boat towing vehicles, camper carrying vehicles and the like all would have their operation enhanced by the heat exchanger of the present invention employed to maintain transmission fluids, power steering fluids, gasoline and the like at a desired lowered temperature.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a vehicular air conditioning system employing a compressor, air cooled condenser, and evaporator with restriction device communicated in series relation for cooling an enclosed compartment with which the evaporator is associated, a heat exchanger incorporated into the suction line between the evaporator and compressor and oriented in series relation thereto whereby refrigerant flowing from the evaporator to the compressor will flow through the heat exchanger, said heat exchanger including a tubular shell having an inlet and an outlet, said shell having a large cross-sectional area as compared with the inlet and outlet to enable refrigerant to pass therethrough with little restriction and to enable expansion of such refrigerant to assure that all refrigerant returning to the compressor is in the vapor phase, heat exchange coil means disposed interiorly of the shell for communication with a source of hot working fluid from the vehicle which is conveyed through the heat exchange means by either a pumping device, thermosiphoning or the like whereby the hot working fluid may be reduced in temperature by the refrigerant returning to the compressor for increased efficiency in the operation of the vehicle, said outlet being slightly larger than the inlet to eliminate restriction of refrigerant flow from the shell of the heat exchanger, said heat exchange coil means includes a primary heat exchange coil having a plurality of elongated oval-shaped convolutions within the shell for passage of a primary hot working fluid, said primary heat exchange coil having said inlet means adjacent the shell inlet so that incoming refrigerant will contact the primary heat exchange coil where the primary hot working fluid is hottest, and a secondary coil having a single substantially U-shaped convolution within the shell for receiving secondary hot working fluid for cooling diverse hot working fluids, said secondary coil overlapping a portion of the primary coil and being provided with substantially less surface area.

* * * * *